Nov. 10, 1964 L. H. WAGNER 3,156,768

VARIABLE LENGTH CODE METHOD AND SYSTEM

Filed July 6, 1962 3 Sheets-Sheet 1

INVENTOR,
LEO H. WAGNER

BY Harry M. Saragovitz
ATTORNEY.

Nov. 10, 1964 L. H. WAGNER 3,156,768

VARIABLE LENGTH CODE METHOD AND SYSTEM

Filed July 6, 1962 3 Sheets-Sheet 2

INVENTOR.
LEO H. WAGNER,

BY Harry M. Saragovitz

ATTORNEY.

Nov. 10, 1964 L. H. WAGNER 3,156,768

VARIABLE LENGTH CODE METHOD AND SYSTEM

Filed July 6, 1962 3 Sheets-Sheet 3

INVENTOR,
LEO H. WAGNER
BY Harry M. Saragovitz
ATTORNEY

United States Patent Office 3,156,768
Patented Nov. 10, 1964

3,156,768

VARIABLE LENGTH CODE METHOD AND SYSTEM

Leo H. Wagner, Holmdel, N.J., assignor to the United States of America as represented by the Secretary of the Army Filed July 6, 1962, Ser. No. 208,134
8 Claims. (Cl. 178—68)
(Granted under Title 35, U.S. Code (1952), sec. 266)

The invention described herein may be manufactured and used by or for the Government for governmental purposes without the payment of any royalty thereon.

Immediately after the invention of movable type printing it became apparent that some characters (word spaces, letters, numbers, symbols, etc.) were used far more frequently than others and should be furnished in greater quantity. The quantity of each character in a standard "font" of type was easily determined statistically, and could be varied for different languages or special fields of subject matter. In communication systems the character has no physical entity as in the case of a piece of type but is more abstract, transmitted as a coded combination of a few very simple elements (variously known as dots, dashes, spaces, marks, zeros, ones, etc.) in which the significance of character frequency is more obscure, altho still very important.

It is very obvious that the number of distinct code elements which a communication system could transmit per unit time would be limited, and therefore for maximum information transmission the code should be planned to transmit the maximum number of characters from such elements. This is recognized crudely in ordinary Morse code using a short single mark element for dot, a double mark element for dash, a single space element between mark elements of a letter, double space between letters of a word, and particularly: a *long space between words, a dot alone for E*, a *dash alone for T*, and various combinations of dots and/or dashes for less common characters; the operator mentally groups the elements to identify the characters and words and therefore distinctness of the character code combinations may be of significant psychological importance, not suited for quantitative measurement as in the case of the code length. In the case of Teletype code the same number of elements (usually 5 or 6) are allowed in each frame for each character and occupied by various combinations of marks or spaces. The uniform frame length per character simplifies synchronization and automatic separation of the characters, suited to Teletype operation. If the frequency of each character (even word spaces) were uniform also such a code would be highly efficient as to the information transmitted. However, the origin of present oral languages and the alphabets applied thereto are almost entirely random and non-scientific but very firmly established; therefore at the present time it would be out of the question to construct a new language merely for communication efficiency; communication must be adapted to existing language.

A systematic study would indicate the nature of the problem to obtain maximum information transmission within the practical limits of a recognized language using characters of different statistical frequency; a precise mathematical approach to the theoretical optimum possible efficiency of variable length codes appears in Modulation Theory, Black, Van Nostrand, 1953, particularly pages 84 to 88. This includes no clear description of suitable techniques for synchronizaiton and separation of the characters, acknowledging that lack of such can lead to gibberish but assuming that restoration would soon occur.

By the present invention it is possible to use a very simple synchronization technique and still secure a coding efficiency very close to the theoretical optimum. While this is suited to very large alphabets, both for easier analysis and a simpler diagram it will be illustrated for an alphabet comparable to ordinary Teletype. According to the present invention the code is made up in frames analogous to the character groups of Teletype code, but with too few elements in each frame to identify anywhere near all of the many characters of a complete alphabet. The ordinary elements of each frame serve only the usual purpose as in any combination code, but one element is used as an "indicator" whether the frame represents the "start" of a character or merely part of the identification to complete one or more prior frames, in which a similar "indicator" has already served this same function (only one of the most common characters of the alphabet being completely identified in one frame, the characters of average frequency being identified in two frames, and rare characters assumed to be completed in three frames altho very rare characters might use further frames). Substantially identical techniques may be used if the indicator is considered to identify the "end" of each character. In fact, merely regrouping an existing train of elements may modify the manner of analysis, one being more convenient at the transmitter and the other at the receiver. In the following the invention will be described first from the standpoint of the simplest analysis, then with variations in the operation or analysis.

In typical text the ordinary elements would be statistically random, but the indicator elements would be predominantly of the type designating "start" (or "end," in every frame for the commonest characters, half the frames for the average characters, and probably one third the frames even for the rare characters). Therefore the indicator elements also provide a very simple way to synchronize the receiver to the frames, as well as their more apparent purpose to indicate the start or end of a character. It should be recognized that this indicator element does not necessarily lose its normal function in such a combination code, but is merely somewhat restricted; that is: a frame of three elements can identify 8 combinations, four used for common characters, the other four as partial identification to be continued in the next frame, in which 16 could be completed and 16 again continued to the third frame. Following a rare character, using the maximum number of frames, the "start" indicator for the next character (or "end" indicator for that character—depending on viewpoint) would be necessarily implied and if needed could be inserted artificially by the receiver; therefore, it could serve as an ordinary bit in transmission to provide further bit combinations for a larger alphabet. The term "bit" (binary digit) is used herein for brevity in identifying the code elements and may be represented by one of two possible states such as electron flow or non-flow, flow toward or from transmitter, excitation at one frequnecy or another, etc. Either state may be identified as "mark," the other "space," to have simple but separate identifications for the two states. Likewise either state may be identified as "one," the other "zero"; this is most useful when the bits have a weighted value and the one or zero represents the presence or absence (the numerical coefficient) of such bit weight. In the following description for simplicity electron flow is identified as the "mark" state and, when the bits represent a numerical weight, also as the "one" state. It will be readily apparent that this is merely a matter of terminology, and actual operation of the invention is not dependent on any particular choice of the states, as long as the circuitry is compatible with the choice made. In polar, frequency shift, the other types of operation there is no basis for choice of designations except the arbitrary choice in starting operation.

An "alphabet" may be of the familiar type involving only letters as the characters but would ordinarily include numerals, punctuation marks, etc. The above example involving a maximum of three frames each including three bits can provide 148 different characters, far more than ordinarily needed. It may be desirable to extend such an alphabet to an entire dictionary of fairly common words, with less common words spelled out from individual letters, and even to include quantities, as frequently involved in telemetering systems, or special purpose symbols, as in weather teletypewriter keyboards. Each additional bit per frame doubles the number of binary combinations for the frame; similarly each added frame per character multiplies the number of binary combinations. Thus, three frames of four bits would provide for an alphabet of 1096 characters rather than the 148 characters noted above. While very large alphabets add to the complexity of the system they may substantially increase the efficiency an also provide a degree of security similar to that obtained by communication methods based on code dictionaries involving a comparable number of words.

The invention will be further described in connection with the accompanying drawings, in which.

Figure 1:
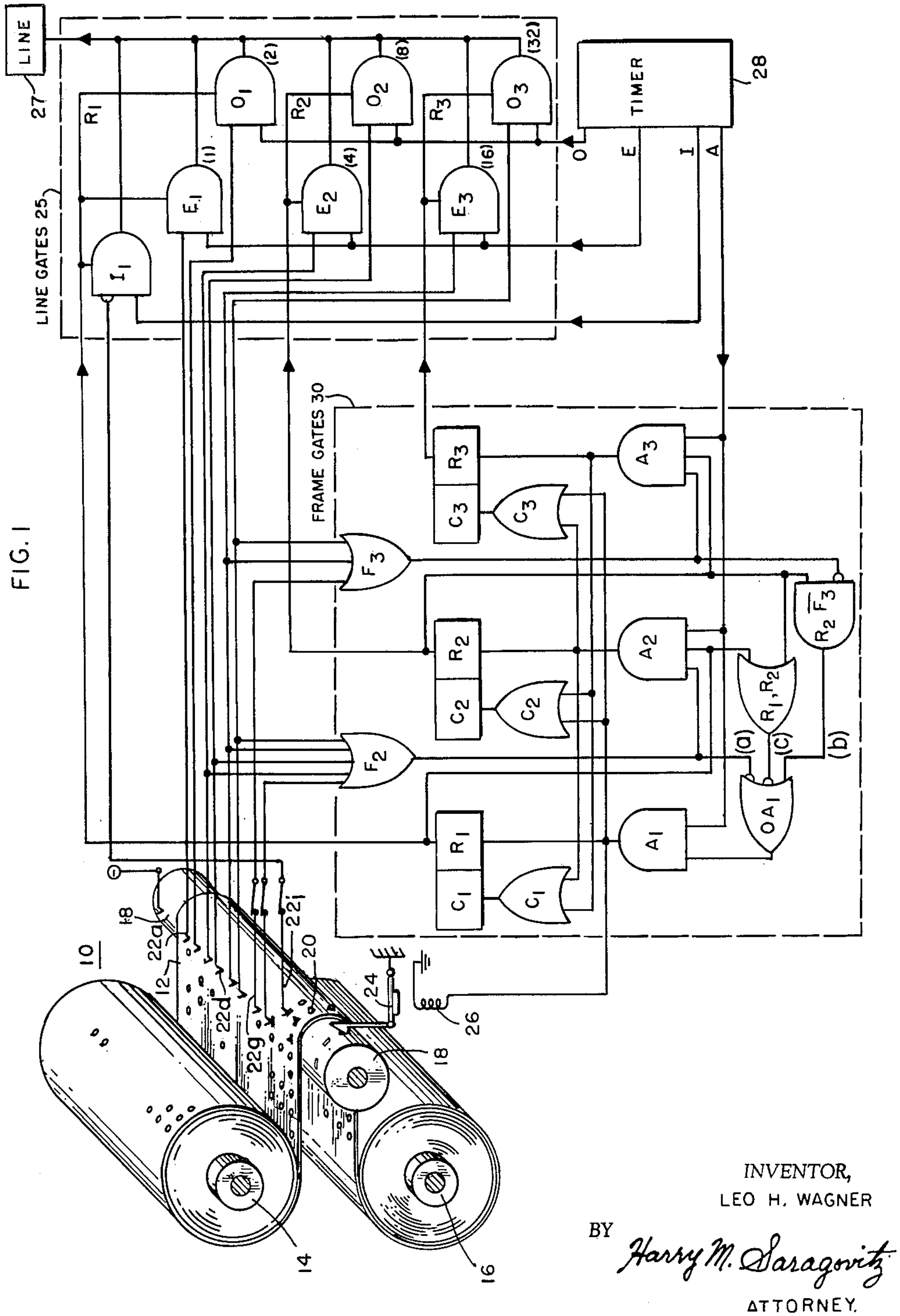
FIG. 1 represents in block form one of the most elementary applications of the invention to a transmitter station.

FIG. 1 relating to a transmitter terminal is intentionally shown in elementary form to emphasize only the basic requirements for operation. Initially it is assumed to be used for transmitting binary data in which ordinary binary numbering is used to identify the various combinations, but the values are here expressed in the decimal system in view of the general familiarity and greater clarity of the larger radix, and to avoid the many digits required for expressing values in the binary system. Information to be transmitted is assumed to be stored on a tape unit 10 including punched tape 12 transferred from a supply roller 14 to a takeup roller 16 over a feed and sensing roller 18. The tape has a continuous column of feed holes to match sprocket feed teeth 20 on the roller 18 and various columns of code punched holes arranged in rows corresponding to the successive characters to be sensed by corresponding contacts 22*a* to *i* as the successive rows reach the transmitting position at roller 18. A simple stepping pawl 24 operated by coil 26 feeds the roller 18 and the tape 12 at the proper time. Following the ordinary binary system the six columns corresponding to contacts 22*a* to *f* can provide $2^6=64$ (=octal 100) different combinations of holes or ones and no-holes or zeros; contacts 22*g*, *h*, *i* will be considered later. Assuming the columns for contacts 22*a* and *b* as least significant they can identify 4 combinations without even using the other four columns. Similarly, 22*a*, *b*, *c*, and *d* can identify 12 additional combinations without using the other two; the other 4 combinations involving binary numbers already identified by contacts 22*a* and *b* alone are neglected for the present.

For convenience the various gates, etc. required in the logic system have been shown in the now familiar form of MIL-STD 806A May 1960, a large D shield shape for AND gates, an analogous but pointed shield shape (one concave and two convex sides) for OR gates, dual box for a "binary" such as a bistable circuit, narrow box rounded at both ends for delay, and small semicircle (or circle) to identify an opposite, inverted, or "inhibit" input to a gate. The reference letters and numerals for the gates have been selected to aid in identifying their functions relating to the Frame, Read, Cancel, Even or Odd (powers of two for the bit weights), Indicate, Advance, etc.

The tape reading contacts 22*a* to *f* are connected thru corresponding AND gates of line gate group 25, providing the various required timing relations, to the line 27. One additional AND gate $I_1$ is connected to the line to send a "mark" indicator bit showing the "start" of a character only in frame 1; at present the inhibit input to this gate is assumed to be disconnected and can be merely ignored. Also during frame 1 gate $E_1$ can pass the Even power of two weight bit (actually zero power, or unit weight), and gate $O_1$ the Odd power (or two weight). Similarly in frame 2 gates $E_2$ and $O_2$ can pass more significant bits (four and eight weight), and in frame 3 gates $E_3$ and $O_3$ can pass the two most significant bits (sixteen and thirty-two weight). No indicator gates are required in frames 2 and 3 since it is assumed that a space indicator bit shows continuation in frames 2 and 3 of a character started in frame 1. Assuming serial transmission two controls for the gates are needed. The simple timer 28 provides the proper bit timing sequence within each successive frame for the "start" Indicator bit and then the Even and Odd power weighted bits. The I, E, and O outputs of the timer connect to the above gates bearing the corresponding letters. The remainder of the logic circuits, in the frame gate group 30, under control of an Advance output A from the timer 28 provides for the proper timing sequence among the successive frames of a character or series of characters according to the invention and for the necessary tape advance. The Read outputs $R_1$, $R_2$, and $R_3$ of bistable circuits $C_1R_1$, $C_2R_2$, and $C_3R_3$ connect to the above line gates bearing the corresponding numbers. Only one bistable circuit at a time can be in the Read state to assure proper operation; similarly only one timer lead at a time can be energized. Thus the line gate group 25 may be controlled to provide the bits of each frame and the frames of each character or series of characters as the characters on the tape are stepped into reading position.

Since frame 1 would always be transmitted, the Advance output of the timer is connected thru AND gate $A_1$ to the advance coil 26 for the tape and also to the Read input to bistable circuit $R_1C_1$ and to the Cancel inputs to circuits $R_2C_2$ and $R_3C_3$, thru OR gates $C_2$ and $C_3$. Similarly, the Advance inputs thru gates $A_2$ and $A_3$ are connected not to the advance coil but only to the corresponding Read inputs and to the non-corresponding Cancel inputs of the bistable circuits, also thru OR gates $C_1$, $C_2$, and $C_3$. The other inputs of Advance gates $A_1$, $A_2$, and $A_3$ are arranged to assure the proper frame sequence.

The OR gates $F_2$ and $F_3$ respond to "ones" in frames 2 and 3 to determine whether such frames need actually be transmitted. If there is no "one" in frame 3 it may be omitted. However, frame 2 may be omitted only if neither frame 2 nor frame 3 has a "one"; if frame 2 were omitted and frame 3 sent the receiver could not distinguish the resulting signal from that obtained if frame 2 were sent and frame 3 omitted, for example: in the usual notation, with least significant bits (frame 1) on the right and bits paired as they would appear in the frames, binary numbers 10 00 01 (=33) and 00 10 01 (=9) would both be received as 10 01 (=9). The AND gate $A_2$ responds to the need for transmitting frame 2 and to a Read state for frame 1 to Read frame 2. Similarly, AND gate $A_3$ provides operation to Read frame 3.

The operation of AND gate $A_1$ is somewhat more complex, as the tape advance and reading of frame 1 must occur at the end of a frame under several circumstances provided thru OR gate $OA_1$ having alternative direct and inverted inputs. Since this is an OR gate it might be misleading to specify an "inhibit" input; any one of the appropriate inputs can produce an output, not inhibited by other inputs. The several circumstances are:

(*a*) Frames 2 and 3 are not needed (and frame 1 ordinarily is being completed), provided in the absence of any input to and output from gate $F_2$ thru the inverted input to OR gate $OA_1$.

(*b*) Frame 3 is not needed and frame 2 is being completed, provided in the absence of any input to and output from similar gate $F_3$ thru the inverted input to AND gate $R_2\overline{F_3}$ while Read output $R_2$ of bistable circuit $C_2R_2$ is applied thru $R_2\overline{F_3}$ into gate $OA_1$.

(*c*) Neither frame 1 nor frame 2 is being read, provided in the absence of any Read output $R_1$ or $R_2$ from bistable circuits $C_1R_1$ and $C_2R_2$ thru OR gate $R_1R_2$ and the inverted input to OR gate $OA_1$. Normally this applies when frame 3 is being read, completing the present character, but would also operate if no frame were being read for the present character, due to failure in starting or later cycling; in the latter event the present character would be merely eliminated with the simple circuit as shown, but could be repeated if desired by a slightly more sophisticated circuit.

These three situations (*a*), (*b*), and (*c*) are identified on FIG. 1 at the corresponding inputs to OR gate $OA_1$.

The foregoing has made use of the $2^6=64$ (=octal 100) combinations available from the six contacts. However, additional combinations could be distinguished at the receiver. Four combinations can be identified in one frame by the ordinary bits; further frames could be "transmitted" even though they included no mark bits either as indicator or ordinary bits, in blank frames, thus identifying sixteen (instead of twelve) combinations in a full two frames and 64 (instead of 48) combinations in a full three frames, a total of 84 combinations in one, two, or three frames.

Previously the combinations were identified by numerical values based on the simple bit weights; the extra blank frames could not alter the overall weight of the character code but nevertheless provide additional combinations which can be identified without requiring any particular weighting. This can be accomplished merely by contacts **22*g* and 22*h* connected to OR gates $F_2$ and $F_3$, with appropriate holes in tape 12. The number of effective combinations using all three frames can be further increased to 128 (instead of 64) providing an overall total of 148 combinations by cancelling the "start" indicator for the next character. This requires the receiver to recognize the "start" from the mere fact that the maximum number of frames has already been used. The contact 22*i* has been shown out of line with the others so that a code punched in one line will provide an "inhibit" input at the proper time to cancel the start indicator from gate $I_1$ (with the next character). Disconnect switches have been shown in the leads to contacts 22*g*, *h*, and *i* in case only the elementary form is needed; the tape punching must be appropriate to the particular operation intended. When the added complexity can be tolerated these variations are often justified to increase the size of the "alphabet," and since the additional combinations would be used only for the comparatively rare characters the statistical properties of the signal would not be altered substantially. It will be helpful to designate the extra columns corresponding to contacts 22*g*, 22*h*, and 22*i* as "Add Frame 3," "Add Frame 2," and "Cancel Start" to analyze the needs of the receiver in duplicating the original tape. Alternatively the columns 22*g* and 22*h*** could be punched to take over the entire function of OR gates $F_2$ and $F_3$, then designated merely "Frame 3" and "Frame 2," also simplifying the receiver.

The simple binary weight values indicated in parentheses beside the AND gates $E_1$, $O_1$, $E_2$, $O_2$, $E_3$ and $O_3$ would be insufficient to distinguish the combinations involving extra blank frames. Coding and decoding techniques frequently involve matters other than weight values or even ignore weight values and therefore may have no effect on operation, but weight designations are very convenient for analysis. In the simplest form the weight designations 0 to 3 for the commonest 1 frame characters, 4 to 15 for 2 frames, and 16 to 63 for 3 frames would be sufficient, with extra blank frames designated by subscript as $0_1$ to $3_1$, $0_2$ to $3_2$ and $4_1$ to $15_1$. It might be preferable to identify all full 3-frame characters merely by weight values 0 to 63 (or 0 to 127 if mark Indicator bit can be cancelled), two frame characters including subscript 2 as $0_2$ to $15_2$ and one frame character as $0_1$ to $3_1$.

In the timer 28 it has been assumed that intervals for Indicator, Even, and Odd output bits are all equal and the Advance output is a mere pulse substantially simultaneous with the beginning of the Indicator output. Actually, at current speeds of operation, the mechanical tape advance requires more time than the transmission of a bit, and can be accomplished while the reading for a previous character is stored for analysis and transmission, ready for similar storage, analysis, and transmission of the next character when needed. In a complete system allowance would be made for operating delays, storage of data during transitions, preventing double tape advance, etc. These refinements would be accomplished by conventional techniques, not essentially related to the invention.

Altho the diagram shows the groups of gates corresponding to the maximum three frames, and the "mark" indicator for start is produced in only the first frame, it must be recognized that the most common characters will not use the second or third frames and therefore most frames will include the start indicator, a significant factor in the operation of the receiver to attain and hold synchronism. In the receiving system it is first necessary to synchronize on the individual bits, a technique common to most code systems, then on the particular bits of a frame identified by the indicator bit. Since the number of frames for a character is not known until the "start" indicator for the next character is received (or the maximum number of frames has been reached), this same indicator has more significance in the receiver as a "stop" indicator for the character just completed. The simplest way to start operation is to send a series of zero weight frames including the "mark" indicators for start every third bit and zeros between, providing for bit synchronization at triple the rate of the indicators and frame synchronization at the same rate and time as the indicators.

Figure 2:
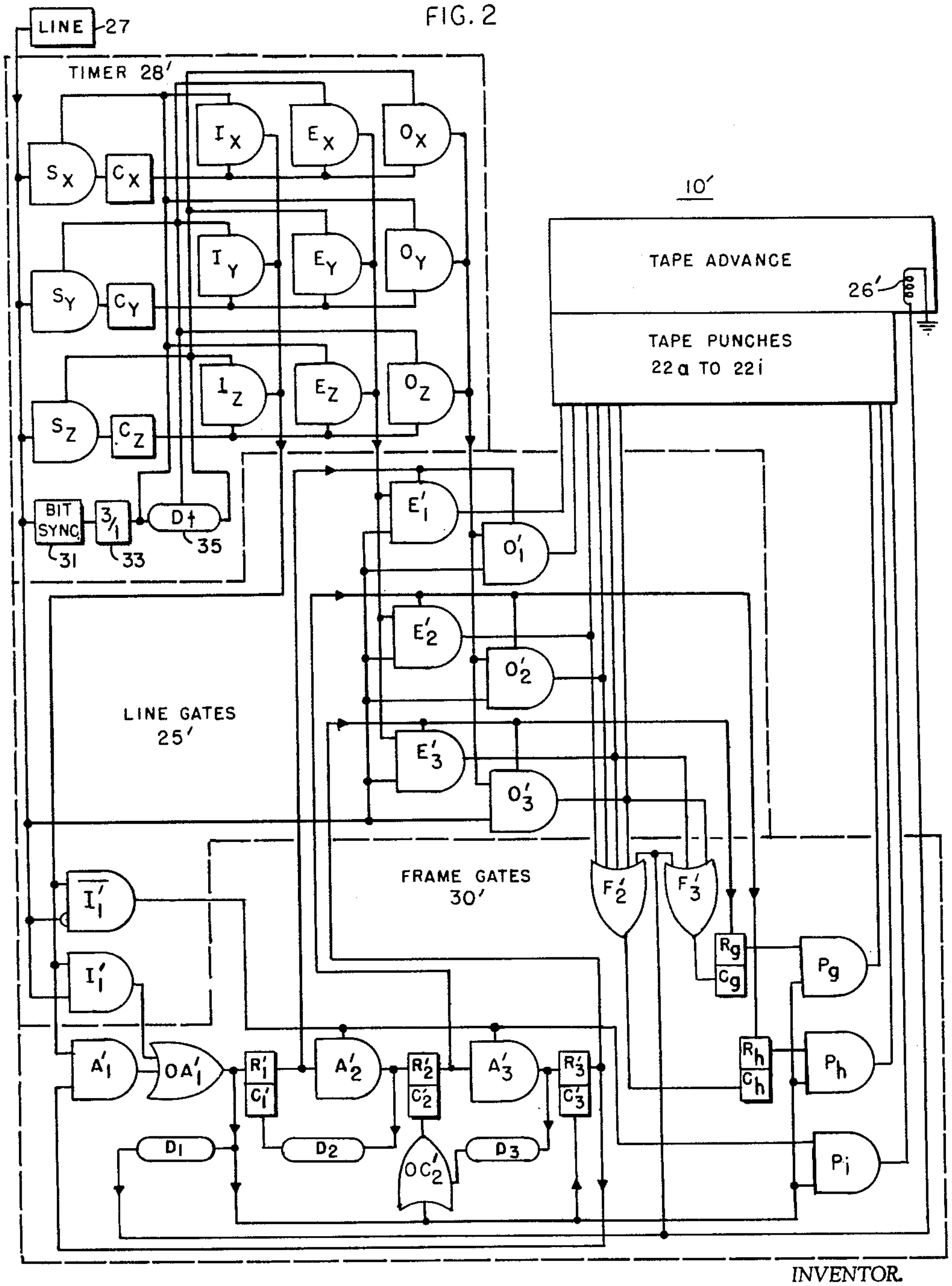
FIG. 2 represents a corresponding receiver station.

FIG. 2 relating to a receiver terminal is also shown in elementary form, as in FIG. 1. In general it includes components somewhat analogous to FIG. 1, such as: the line gates 25′ for connecting from the line to the tape system 10′ (in this case assumed to use punches for duplicating the original tape), the timer 28′ for controlling the line gates as to selecting the bits of each frame, and the main portion of the frame gates 30′ for controlling such line gates as to selecting the various frames of a character. A relatively minor portion of the frame gates is used to separate signals from the "extra" contacts **22*g*, 22*h*, or 22*i* (if used) so that they also may be duplicated at the receiver tape. As usual in code receivers the timer 28′** must be synchronized to that at the transmitter, both as to individual bits and as to their proper grouping into the "frames." In prior systems each frame corresponds to a character, but substantially the same techniques will apply as far as the timer for separating the frames is concerned. After the timer, the necessary techniques correspond more closely to those used at the transmitter terminal of FIG. 1.

In the elementary form shown in FIG. 2 the line 27 from FIG. 1 first controls a bit synchronizing circuit 31 to generate pulses at each bit, then a 3 to 1 divider 33 to generate pulses at the corresponding bit of *each* frame and a delay network 35 to generate pulses at each of the two other corresponding bits of each frame. At this point it is not known which of the three pulse outputs correspond to the indicator bit of a frame. Therefore, each of the three pulse output trains controls one of synchronizing gates $S_x$, $S_y$, or $S_z$ all connected to the line; the outputs of such gates are integrated in comparators $C_x$, $C_y$, or $C_z$ to determine which corresponds to a predominantly *mark* signal, used as indicator as discussed in connection with the transmitter. The matrix of gates $I_x$, $I_y$, $I_z$, $E_x$, $E_y$, $E_z$, and $O_x$, $O_y$, $O_z$ is so connected that the proper pulses to identify Indicate, Even, and Odd bits appear at the respective outputs of the timer unit whichever one of the three possible relations between input and output of the 3 to 1 divider may have occurred. At this point the timer is effectively synchronized to that at the transmitter and may be used for control of the line gates 25′ corresponding to those at the transmitter. The Odd and Even line gates may be connected directly to the corresponding tape punches *22a′* to *22f′* as in the case of sensing contacts *22a* to *22f* at the transmitter. The Indicator line gates $I_1'$ and $\overline{I_1'}$ are used to control the frame gates 30 as required (1) for the further control of line gates 25′ according to the number of frames for each successive character, and (2) for the control of punch *22i′* when the corresponding contact *22i* has cancelled the usual "start" indicator bit after a 3-frame character.

The receiver frame gates also include bistable circuits $C_1'R_1'$, $C_2'R_2'$, and $C_3'R_3'$ whose Read ouputs $R_1$, $F_2'$, and $R_3'$ are connected to the line gates having the corresponding numerals. In the receiver the timer Indicator output can also provide for advance of the frame gates without a separate Advance output; this is accomplished thru Advance AND gates $A_2'$, $A_3'$, controlled by the Read output of the next prior bistable circuit providing there is no received mark Indicator bit at the time as determined by AND gate $\overline{I_1'}$. In the case of a new character, the received mark Indicator bit at AND gate $I_1'$ is used to return the system to Read frame 1. The AND gate $A_1'$ may do the same when the last frame has been read, even if the mark Indicator bit failed to occur. The OR gate $OA_1'$ is used to combine the outputs of these two AND gates. It is necessary to cancel Read outputs when their purpose is completed, for example: the Read input to $R_2'$ is also used thru delay $D_2$ as a Cancel input to $C_1'$, the input to $R_3'$ thru delay $D_3$ to $C_2'$, and the input to $R_1'$ to both $C_3'$ and $C_2'$ (thru OR gate $OC_2'$ to combine with the output of delay $D_3$). The input to $R_1'$ is also used to actuate the tape advance coil 26′ thru a delay $D_1$ included for reasons noted later.

If the transmitter uses the outputs of contacts *22g*, *22h*, *22i* combined with the usual inputs involved in the elementary operation of OR gates $F_2$ and $F_3$, for the receiver to duplicate the transmitter tape it is necessary to identify certain combinations in operating receiver punches *22g′*, *22h′*, *22i′*. Therefore bistable circuit $R_gC_g$ is set to Read state if Read output $R_3'$ is set to read frame 3, but cancelled if a weighted "one" bit follows in frame 3 to require such reading of frame 3 as determined by OR gate $F_3'$; similarly circuit $R_hC_h$ is set to Read state if Read output $R_2$ is set to Read frame 2 but Cancelled if a weighted "one" but follows in frame 2 (also frame 3 if read) to require such reading of frame 2 as determined by OR gate $F_2'$. At the end of the character these Read outputs are combined in AND gates $P_g$ and $P_h$ with the output from OR gate $OA_1'$ to show that the extra frames must have originated from punch holes in corresponding columns of original tape 12 (since there were no holes in columns corresponding to contacts *22g* to *h* to require the frame) and to control corresponding punches *22g′* and *22h′*. After using Read outputs of $C_gR_g$ and $C_hR_h$ they are cancelled by an additional output from delay $D_1$ thru OR gates $F_2'$ and $F_3'$ at the same time the tape is advanced after reading and punching is complete. Similarly, but more simply, AND gate $P_1$ determines from the output of OR gate $OA_1'$, in the absence of a mark Indicator bit as shown by the output of AND gate $\overline{I_1'}$, that the usual mark Indicator bit for start must have been cancelled at gate $I_1$ in the transmitter by a pulse from contact *22i*; this is true because advance to frame 1 in the absence of a mark Indicator bit for start can only occur at the end of frame 3 thru operation of AND gate $A_1'$. In the foregoing the reference to "holes" is convenient because of the physical existence, and has been assumed to correspond to a "mark" bit and in some cases to a "one" bit. Actually, the functions are interchangeable according to the particular details of the components to be used.

If the transmitter omits gates $F_2$ and $F_3$, relying only on the punch holes in the tape in columns corresponding to contacts *22g* and *22h* for actuating gates $A_2$ and $A_3$, the receiver also may omit gates $F_2'$, $F_3'$, $P_g$, $P_h$, and bistable circuits $R_gC_g$ and $R_hC_h$; the mere reading of frames 3 and 2 shows that the corresponding contacts *22g* and *22h* must have sensed holes and therefore corresponding punches *22g′* and *22h′* may be actuated directly by the bistable circuit outputs $R_3'$ and $R_2'$. The original code tape must be properly punched for the mode of operation intended in order that the receiver tape will be a duplicate. For example: In the circuit of FIGS. 1 and 2 if the columns corresponding to contacts *22c* to *22f* include holes requiring frames 2 and 3, unnecessary holes in columns corresponding to contacts *22g* and *22h* would be redundant to the described operation and therefore not duplicated at the receiver. On the other hand, omitting gates $F_2$ and $F_3$, unless columns corresponding to contacts *22g* and *22h* included holes there would be no frames in which to transmit mark bits representing holes in columns corresponding to contacts *22c* to *22f*.

Figure 4:
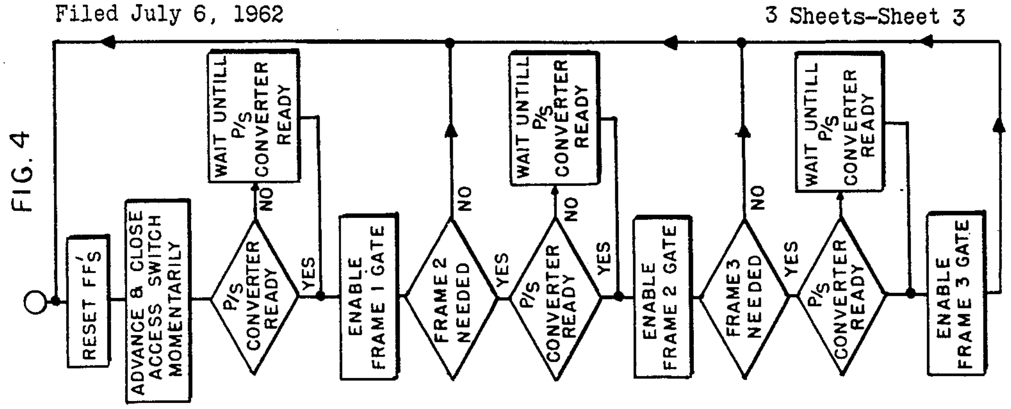
FIG. 4 represents a functional flow chart useful in analyzing operation of FIG. 3.
Figure 3:
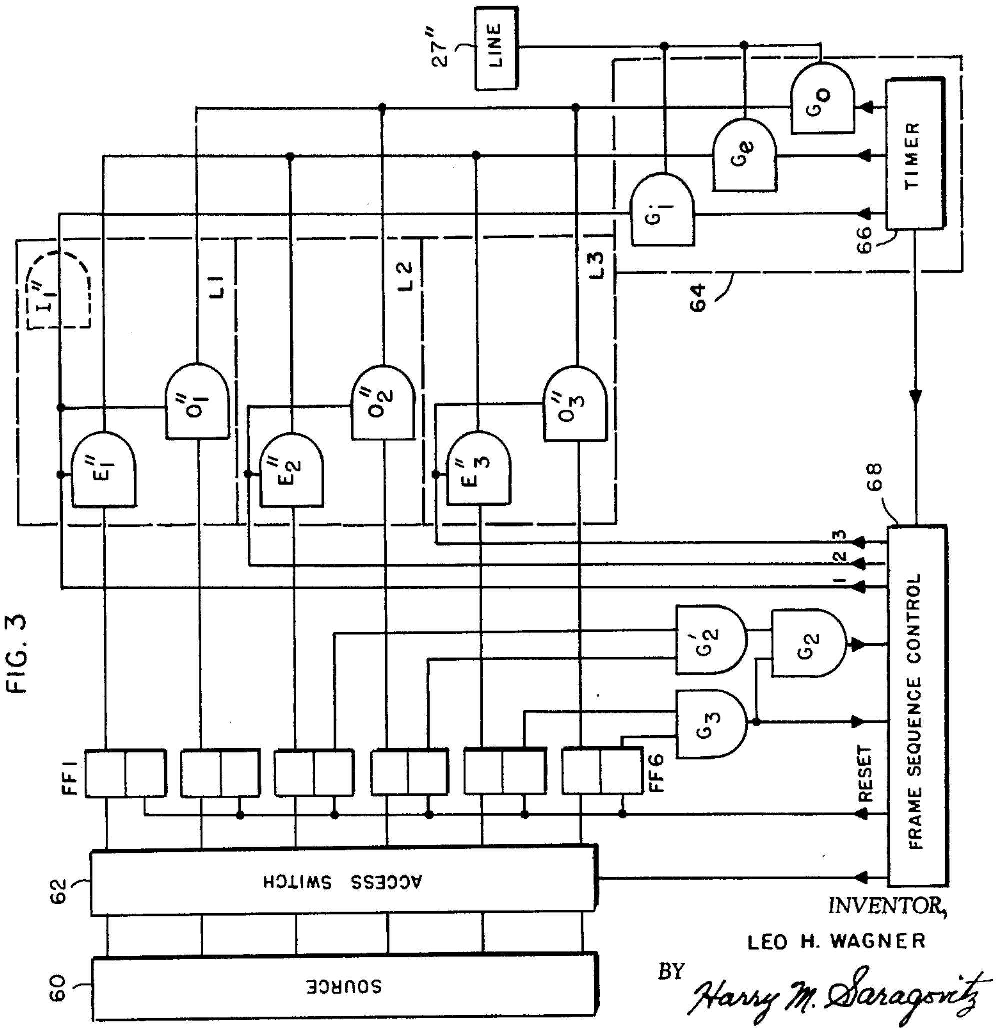
FIG. 3 represents an alternative transmitter station.

FIGS. 3 and 4 are used to present the invention from a slightly different viewpoint, generally equivalent to FIG. 1.

FIG. 3 includes a source of binary data 60 with an access switch 62 corresponding generally to the tape unit 10 of FIG. 1. In this case the data is stored in bistable (flip-flop) circuits $FF_1$ to $FF_6$ and would not be lost if the source data changed with the access switch opened before transmission. This allows most of the frame period for the mechanical delay involved in advance of the tape.

The data is transferred to the line thru line gates $L_1$, $L_2$, $L_3$, controlled by frame sequence control 68, and also a parallel to serial (P/S) converter 64 including Indicator, Even, and Odd AND gates $G_i$, $G_e$, and $G_o$ controlled by a timer 66. The line gates $L_1$, $L_2$, $L_3$ actually include separate AND gates $E_1''$, $O_1''$, etc. as shown corresponding to FIG. 1. The AND gate $I_1''$ in dotted lines is merely for comparison to FIG. 1; no actual gate is required since a mark Indicator bit is transmitted in each frame 1 under control of gate $G_1$ and the timer 66. On the other hand, a space indicator bit is used in each frame 2 or 3 and requires no indicator gates for frame 2 or 3 either in this figure or FIG. 1. In some communication systems the message must await an available channel. This is assumed in the timer 66, having a "ready" output to start the transmission. It has no direct significance in the operation of the invention but merely represents a typical operating situation. The two groups of gates, one group with timer inputs and one with framing inputs, correspond to the single set of line gates 25 in FIG. 1 with both timer and framing inputs.

The gates $G_2'$, and $G_3$ are shown as AND gates connected to the reset outputs of bistable circuits, used to determine whether frames 2 and 3 are needed, and produce output only while both bistable circuits are reset. This is the opposite of the OR gates $F_2$ and $F_3$ of FIG. 1, but the frame sequence control can readily be connected to respond to such an opposite input. Also the separate AND gate $G_2$ combines the outputs of $G_2'$ and $G_3$; this merely involves a substitution of three simple gates for the one simple gate $F_3$ and one more complex (multiple input) gate $F_2$ in FIG. 1. In this figure no provision is shown for the extra blank frames or cancellation of the "mark" indicator after a 3-frame character; this could be accomplished as in FIG. 1 if the larger alphabet were found to be desirable. The frame sequence control 68 provides for the functions of the frame gates 30 in FIG. 1, except the portion already covered by gates $G_2$, $G_2'$, and $G_3$.

Instead of a detailed block diagram of the frame sequence control, FIG. 4 is in the form of a functional flow chart, common in programming a general purpose data processing device for a particular pupose. The functional flow chart represents a description of the operation that might ordinarily be covered in the text material, but the chart form is simpler to read and emphasizes the situations in which the same result follows from more than one cause. From such a chart the necessary block diagram as in FIG. 1 may be readily prepared. The chart has the advantage of directly emphasizing the functions accomplished, whereas a block diagram must be analyzed to determine such functions. Either one can be converted to the other by those familiar with data processing devices.

The invention has been described on the basis of binary (bit) coding, although it also applies with ternary or other coding. In such cases the additional states of the indicator pulses beyond the start and continuation states, allow use as coding pulses to further extend the size of the alphabet, somewhat analogous to the cancellation of the mark Indicator bit for start as described above.

The description also assumes serial coding on one line although parallel coding on multiple channels might be used. The term "frame" commonly applied to serial groups of a few elements of one character as in Teletype, more elements of a full set of different messages as in multiplex systems, or elements of one complete picture as in television, applies in the present case whether the group represents a complete character or not and involves either serial or parallel transmission of the elements. In this case the indicator pulses could often be identified by the channel used, allowing greater freedom in their properties since they need not be statistically distinguished from the ordinary code pulses.

Some practical variations of this invention have already been described. Many other variations will be apparent to those skilled in the art.

What is claimed is:

1. In pulse code communication involving characters of widely varying occurrence frequency, the *method* of increasing communication efficiency involving transmitting a succession of frames each including a fixed number of equal length code elements of a few discrete states sufficient to identify only the most common characters and progressively increasing pluralities of frames sufficient to identify progressively less common characters, each frame including an indicator element and a few combinational code pulses, a first state of the indicator element identifying the start of a new character and completion of an old character, other states of the indicator element normally identifying the continuation of a character started in a prior frame, the indicator elements over many frames being predominantly of said first state, and the code elements over many frames being randomly and statistically equally shared in said first and other states; synchronizing and separating the indicator and code elements of successive frames as identified by the predominance of said first state in the indicator elements and randomness of the various states in the code pulses over many frames; and also synchronizing and grouping the frames of successive characters by the absence of said first state in the indicator element of the particular frames.

2. In pulse code communication involving characters of widely varying occurrence frequency, the *method* of increasing communication efficiency involving transmitting a succession each including a fixed number of equal length bits sufficient to identify only the most common characters and progressively increasing pluralities of frames sufficient to identify progressively less common characters, each frame including an indicator bit and a few combinational code bits, a first state of the indicator bit identifying the start of a new character and completion of an old character, the other state of the indicator bit normally identifying the continuation of a character started in a prior frame, the indicator bits over many frames being predominantly of said first state, and the code bits over many frames being randomly and statistically equally shared in said first and other state; synchronizing and separating the indicator and code bits of successive frames as identified by the predominance of said first state in the indicator bits and randomness of the states in the code bits over many frames; and also synchronizing and grouping the frames of successive characters by the absence of said first state in the indicator bit of the particular frames.

3. In pulse code communication involving characters of widely varying occurrence frequency, the *method* of increasing communication efficiency involving transmitting a succession each including a fixed number of equal length bits sufficient to identify only the most common characters and progressively increasing pluralities of frames sufficient to identify progressively less common characters, each frame including an indicator bit and a few combinational code bits, a mark indicator bit identifying the start of a new character and completion of an old character, a space indicator bit normally identifying the continuation of a character started in a prior frame, the indicator bits over many frames being predominantly mark, and the code bits over many frames being randomly and statistically equally mark and space; synchronizing and separating the indicator and code bits of successive frames as identified by the predominance of said mark indicator bits and randomness of the mark and space code bits over many frames; and also synchronizing and grouping the frames of successive characters by the space indicator bit of the particular frames.

4. In a pulse code communication system, means for transmitting characters of widely varying occurrence frequency, with increasing communication efficiency, involving a succession of frames each including a fixed number of equal length code elements of a few discrete states sufficient to identify only the most common characters and progressively increasing pluralities of frames sufficient to identify progressively less common characters, each frame including an indicator element and a few combinational code elements, a first state of the indicator element identifying the start of a new character and completion of an old character, other states of the indicator element normally identifying the continuation of a character started in a prior frame, the indicator elements over many frames being predominantly of said first state, and the code elements over many frames being randomly and statistically equally shared in said first and other states; means for synchronizing and separating the indicator and code elements of successive frames as identified by the predominance of said first state in the indicator elements and randomness of the various states in the code elements over many frames; and means for also synchronizing and grouping the frames of successive characters by the absence of said first state in the indicator element of the particular frames.

5. In a pulse code communication system, means for transmitting characters of widely varying occurrence frequency, with increasing communication efficiency, involving a succession of frames each including a fixed number of equal length bits sufficient to identify only the most common characters and progressively increasing pluralities of frames sufficient to identify progressively less common characters, each frame including an indicator bit and a few combinational code bits, a first state of the indicator bit identifying the start of a new character and completion of an old character, the other state of the indicator bit normally identifying the continuation of a character started in a prior frame, the indicator bits over many frames being predominantly of said first state, and the code bits over many frames being randomly and statistically equally shared in said first and other states; means for synchronizing and separating the indicator and code bits of successive frames as identified by the predominance of said first state in the indicator bits and randomness of the states in the code bits over many frames; and means for also synchronizing and grouping the frames of successive characters by the absence of said first state in the indicator bit of the particular frames.

6. In a pulse code communication system, means for transmitting characters of widely varying occurrence frequency, with increasing communication efficiency, involving a succession of frames each including a fixed number of equal length bits sufficient to identify only the most common characters and progressively increasing pluralities of frames sufficient to identify progressively less common characters, each frame including an indicator bit and a few combinational code bits, a mark indicator bit identifying the start of a new character and completion of an old character, a space indicator bit normally identifying the continuation of a character started in a prior frame, the indicator bits over many frames being predominantly mark, and the code bits over many frames being randomly and statistically equally mark and space; means for synchronizing and separating the indicator and code bits of successive frames as identified by the predominance of said mark indicator bits and randomness of the mark and space code bits over many frames; and means for also synchronizing and grouping the frames of successive characters by the space indicator bit of the particular frames.

7. In pulse code communication involving characters of widely varying occurrence frequency, the method of increasing communication efficiency involving transmitting a succession of frames each including a fixed number of fixed length code elements of a few discrete states sufficient to identify only the most common characters and progressively increasing pluralities of frames sufficient to identify progressively less common characters, each frame including an indicator element and a few combinational code elements, a first state of the indicator element identifying the start of a new character and completion of an old character, another state of the indicator element normally identifying the continuation of a character started in a prior frame; separating the indicator and code elements of successive frames; and grouping the frames of successive characters by the absence of said first state in the indicator element of the particular frames.

8. In a pulse code communication system, means for transmitting characters of widely varying occurrence frequency, with increasing communication efficiency, involving a succession of frames each including a fixed number of fixed length code elements of a few discrete states sufficient to identify only the most common characters and progressively increasing pluralities of frames sufficient to identify progressively less common characters, each frame including an indicator element and a few combinational code elements, a first state of the indicator element identifying the start of a new character and completion of an old character, other states of the indicator element normally identifying the continuation of a character started in a prior frame; means for separating the indicator and code elements of successive frames; and means for grouping the frames of successive characters by the absence of said first state in the indicator element of the particular frames.

References Cited in the file of this patent

UNITED STATES PATENTS 2,404,565 Bumstead ------------- July 23, 1946